United States Patent [19]
Okubo

[11] Patent Number: 5,185,704
[45] Date of Patent: Feb. 9, 1993

[54] VEHICLE ANTI-LOCK CONTROL METHOD

[75] Inventor: Satomi Okubo, Saitama, Japan

[73] Assignees: Akebono Research and Development Centre Ltd., Hanyu; Akebono Brake Co., Ltd., Tokyo, both of Japan

[21] Appl. No.: 574,220

[22] Filed: Aug. 29, 1990

[30] Foreign Application Priority Data

Aug. 31, 1989 [JP] Japan ................................. 1-222825

[51] Int. Cl.$^5$ ................................................ B60T 8/58
[52] U.S. Cl. ................................. 364/426.02; 303/96; 303/102
[58] Field of Search ................ 364/426.02, 426.03; 303/95, 96, 98, 102, 103, 105, 100, 106; 180/197

[56] References Cited

U.S. PATENT DOCUMENTS

| | | | |
|---|---|---|---|
| 4,657,313 | 4/1987 | Fennel et al. | 303/100 |
| 4,741,580 | 5/1988 | Matsubara et al. | 303/105 |
| 4,755,945 | 7/1988 | Kade et al. | 303/100 |
| 4,759,589 | 7/1988 | Leiber | 364/426.02 |
| 4,881,785 | 11/1989 | Ushijima et al. | 303/100 |
| 5,043,898 | 8/1991 | Yoshino | 303/95 |

*Primary Examiner*—Gary Chin
*Attorney, Agent, or Firm*—Cushman, Darby & Cushman

[57] ABSTRACT

In the vehicle using the three-channel anti-lock control method based on the front wheel independent-and-rear wheel select-low, only when the third system speed Vs3 to which the left and right rear wheels belong is subjected to the anti-lock control due to the abruptly decreasing of the third system speed before at least one of the left and right front wheel systems begin to be subjected to the anti-lock control, the decrease of the brake hydraulic pressure is not started even if the third system speed Vs3 becomes lower than the above threshold speed VT1 (Vs3<VT1). In such case, only when the third system speed Vs3 becomes equal to or lower than the reference speed Vr (Vs3≦Vr), the decrease of the hydraulic pressure is started. By doing so, an excessive decrease of the brake hydraulic pressure in the third system at the time of the braking during the turning of the vehicle is prevented.

2 Claims, 5 Drawing Sheets

VEHICLE ANTI-LOCK CONTROL METHOD

BACKGROUND OF THE INVENTION

This invention relates to an anti-lock control method for preventing a wheel lock when braking a running vehicle.

Generally, in an anti-lock control apparatus for a vehicle, for the purpose of securing the steerability and the running stability of the vehicle and of reducing the braking distance, a control mode of brake hydraulic pressure is determined in accordance with an electric signal representative of a wheel speed detected by a wheel speed sensor, and a hold valve in the form of a normally-open solenoid valve and a decay valve in the form of a normally-closed solenoid valve are opened and closed, so that the brake hydraulic pressure is controlled by a control unit, including a microcomputer, to be increased (pressurized), held and decreased.

In such an anti-lock control, each wheel speed to be controlled is set as a system speed Vs in a respective one of a plurality of hydraulic pressure systems.

FIG. 5 is an illustration of such anti-lock control, showing variations in the system speed Vs, the wheel acceleration and deceleration dVs/dt and the brake hydraulic pressure Pw as well as a hold signal HS for opening and closing the hold valve and a decay signal DS for opening and closing the decay valve.

When the brake is in an inoperative condition during the running of the vehicle, the brake hydraulic pressure Pw is not increased, and since the hold signal HS and the decay signal DS are both in the OFF state, the hold valve is in an open condition, and the decay valve is in a closed condition. With the braking operation, the brake hydraulic pressure Pw is pressurized from time t0 to abruptly increase (normal mode), so that the system speed Vs decreases. There is set a reference wheel speed Vr which follows the system speed Vs in such a manner that the reference wheel speed Vr is kept lower by a constant speed $\Delta V$ than the system speed Vs. When the deceleration (negative acceleration) dVs/dt of the system speed Vs reaches a predetermined threshold value (for example, $-1G$) at time t1, the reference speed Vr is set to linearly decrease from this time t1 at a gradient $\theta$ of deceleration of $-1G$. Then, at time t2 when the deceleration dVs/dt of the system speed Vs reaches a threshold value $-Gmax$ (for example, $-2G$) representing a predetermined maximum deceleration, the anti-lock control is started, and the hold signal HS is turned to the ON state to close the hold valve, thereby holding the brake hydraulic pressure Pw.

As a result of holding the brake hydraulic pressure Pw, the system speed Vs is further decreased, and becomes lower than the reference speed Vr at time t3. At this time t3, the decay signal DS is turned to the ON state to open the decay valve, thereby starting the decrease of the brake hydraulic pressure Pw. Due to this pressure decrease, the system speed Vs begins to increase from time t4 of its low peak. At this time t4 of the low peak, the decay signal DS is turned to the OFF state to close the decay valve, thereby finishing the decrease of the brake hydraulic pressure Pw to hold the brake hydraulic pressure Pw. The system speed Vs reaches the high peak at time t7, and the increase of the brake hydraulic pressure Pw is again started from this time t7. With respect to this pressure increase, the increase and hold of the brake hydraulic pressure Pw are alternately effected repeatedly by switching the hold signal HS between the ON state and the OFF state at relatively small time intervals, thereby gently increasing the brake hydraulic pressure Pw to decrease the system speed Vs, and the pressure decrease mode is again started at time t8 (corresponding to time t3).

On the other hand, an estimated vehicle speed Vv is set as an approximate value of the vehicle speed. This estimated vehicle speed Vv is obtained by selecting the highest wheel speed VwH out of the four wheel speeds (four-wheel select-high) and by restricting a following limit relative to this highest wheel speed (four-wheel select-high speed) VwH, for example, to a range of $\pm 1G$.

Time t5 when the system speed Vs has recovered from a low peak speed Vl to a speed $Vb(=Vl+0.15Y)$ which is higher than the low peak speed Vl by an amount corresponding to 15% of a speed difference Y between a system speed Va at time t3 of the start of the pressure decrease and the low peak speed Vl, as well as time t6 when the system speed Vs has recovered from the low peak speed Vl to a speed $Vc(=Vl+0.8Y)$ which is higher than the low peak speed Vl by an amount corresponding to 80% of the above speed difference Y, is detected. A first pressure increase period Tx starting from time t7 is determined by a road surface friction coefficient $\mu$ based on the calculation of an average acceleration $(Vc-Vb)/\Delta T$ obtained during a period $\Delta T$ between time t5 and time t6. Subsequent pressure hold period or pressure increase period is determined based on the deceleration dVs/dt detected immediately before such pressure hold or pressure increase.

By the combination of the above increase, hold and decrease of the brake hydraulic pressure Pw, the system speed Vs is controlled so as to decrease the vehicle speed without locking the wheels.

Generally, when such an anti-lock control method is applied to the vehicle, there has widely been used a three-channel anti-lock control method in which the speeds of left and right front wheels represent first and second system speeds, respectively, and a lower speed out of the speeds of left and right rear wheels is selected (select-low) and is used as a third system speed, and the brake hydraulic pressures with respect to these three system speeds are controlled independently of one another, thus effecting so called front wheel independent-and-rear wheel select-low anti-lock control method.

As is clear from the foregoing, in the conventional anti-lock control method, in order to increase the S/N ratio in view of road surface noises or the like, the deceleration threshold value at which the reference speed Vr is changed to a constant deceleration gradient is set to a value (for example, $-1G$) greater than a deceleration value of the vehicle speed produced by an ordinary deceleration. It is detected that the deceleration of the system speed Vs reaches the above predetermined threshold value $-1G$, and based on this detection, the reference speed Vr is decreased from time t1 at a deceleration gradient $\theta$, and at time t3 when the system speed Vs becomes lower than the reference speed Vr, the decrease of the brake hydraulic pressure Pw is started. Therefore, when with a gentle braking operation, the system speed Vs is decreasing at such deceleration $-dVs/dt$ (for example, $-0.7G$) that the system speed Vs does not reach the predetermined threshold value $-1G$, the reference speed Vr only follows the system speed Vs with the speed difference $\Delta V$, and hence does not intersect the system speed Vs. Therefore, the deceleration continues apart from the vehicle speed, with the decrease point of the brake hydraulic pressure Pw not detected, and as a result there is a possibility that a premature wheel lock may occur on a low-$\mu$ road surface.

SUMMARY OF THE INVENTION

Accordingly, the present inventor has proposed in U.S. patent application Ser. No. 07/403,375, now U.S. Pat. No. 4,984,164, an anti-lock control method in which there is set a threshold speed VT1 which follows the above estimated vehicle speed Vv with a constant speed difference relative thereto in such a manner that the relation (Vv>VT1) is kept, and the decrease of the brake hydraulic pressure is started at an earlier one out of the time when the system speed Vs becomes lower than the reference speed Vr and the time when the system speed Vs becomes lower than the above threshold speed VT1.

With this method, even when the system speed Vs gently decreases, the pressure decrease is started from the time when the system speed Vs becomes lower than the threshold speed VT1, and therefore advantageously a stable pressure decrease starting point can always be obtained.

However, with respect to the braking during the turning of the vehicle, it has been found that the following problems can be encountered. Namely, at the time of the braking during the turning, a large speed difference is produced between the inner wheel and the outer wheel, and therefore the estimated vehicle speed Vv determined by the four-wheel select-high system selecting the highest wheel speed among the four wheel speeds is calculated based on the speed of the outer wheel during the turning. As a result, the above threshold speed VT1 is set to a relatively high level, and therefore in the rear wheel control system in which the speed of the lower-speed wheel is used as the system speed, the lower-speed inner wheel during the turning is selected as the system speed, so that when the anti-lock control is started, the system speed soon becomes lower than the threshold speed VT1, thereby starting the decrease of the brake hydraulic pressure. Therefore, the brake hydraulic pressure is excessively decreased, so that the braking force tends to be inadequate.

It is therefore an object of this invention to provide an anti-lock control method which can prevent an increase of a braking distance which would be caused by an inadequate brake hydraulic pressure at the time of the braking during the turning of a vehicle.

In the present invention, there is set the reference speed Vr which, when the system speed Vs decreased by increasing the brake hydraulic pressure reaches the predetermined deceleration, linearly decreases at the predetermined deceleration from the speed (Vs−$\Delta$V) that is lower a predetermined value $\Delta$V than the system speed Vs. Also, there is set the threshold speed VT1 which follows the estimated vehicle speed Vv with a constant speed difference relative thereto in such a manner that the relation of Vv>VT1 is kept.

The decrease of the brake hydraulic pressure is started from an earlier one out of the time when the system speed Vs becomes equal to or lower than the reference speed Vr (Vs$\leq$Vr) and the time when the system speed Vs becomes lower than the threshold speed VT1 (Vs<VT1). With respect to the third system to which the left and right rear wheels belong, only when the anti-lock control of the third system is started prior to both anti-lock controls of the first and second systems to which the left and right front wheels belong, respectively, the decrease of the brake hydraulic pressure is started only if the third system speed Vs becomes equal to or lower than the reference speed Vr (Vs3$\leq$Vr).

DESCRIPTION OF THE PREFERRED EMBODIMENT OF THE INVENTION

A preferred embodiment of the present invention will now be described in detail with reference to the drawings.

Figure 1:
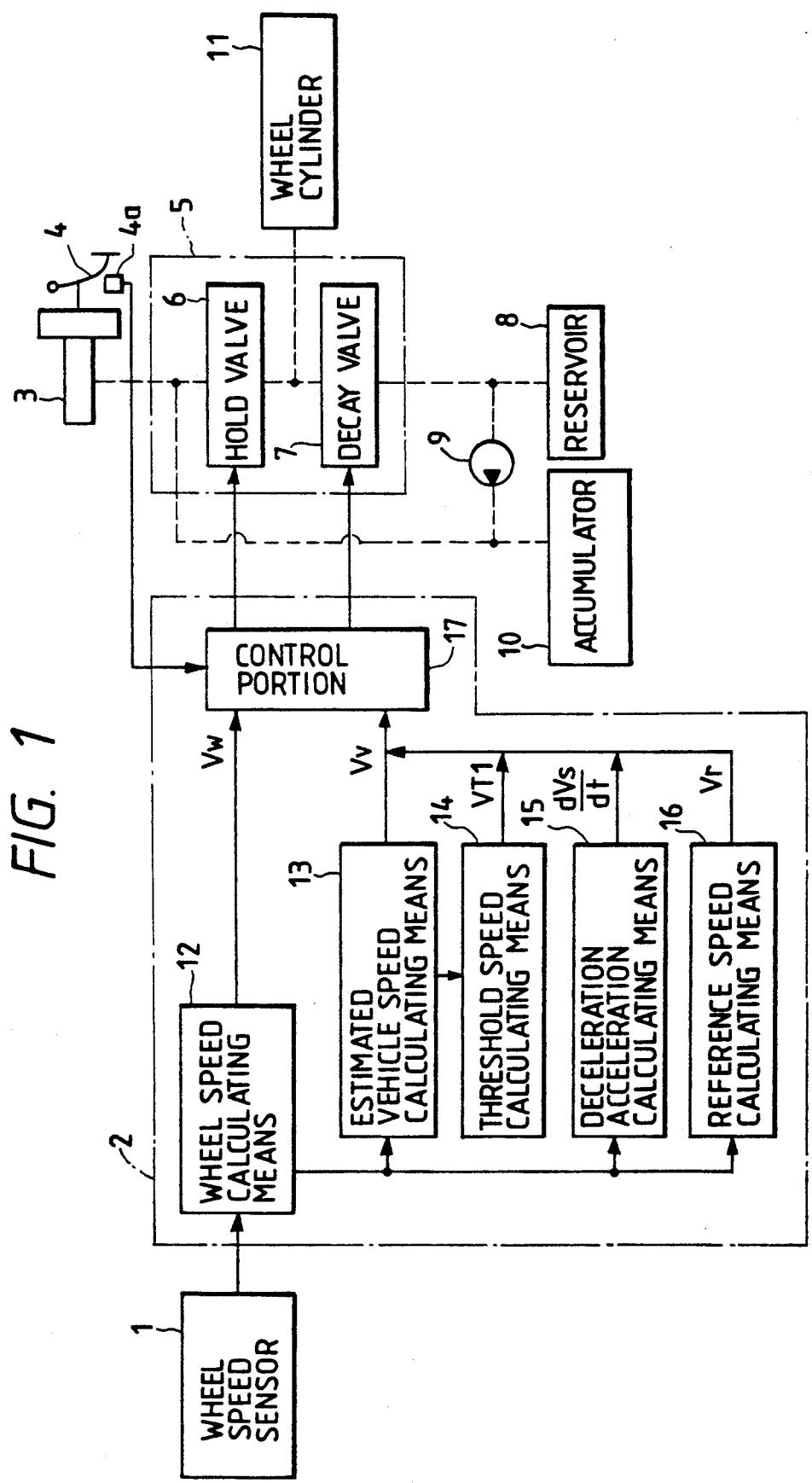
FIG. 1 is a block diagram of a control system to which an anti-lock control of the present invention is applied.

FIG. 1 is a block diagram of a control system for performing the present invention. In FIG. 1, the control system comprises: wheel rotational-speed sensors 1 connected respectively to four wheels; a control unit 2 comprising a computer; a master cylinder 3 operated by a brake pedal 4; a modulators 5 for controlling hydraulic pressure of three systems, each having a hold valve 6 in the form of a normally-open solenoid valve and a decay valve 7 in the form of a normally-closed solenoid valve; a reservoir 8; and an accumulator 10. A brake fluid is pumped by a pump 9 from the reservoir 8, and is stored in the accumulator 10. A brake switch 4a is turned on upon pressing-down of the brake pedal 4, and reference numeral 11 denotes wheel cylinders of a brake device for the wheels.

The control unit 2 comprises speed calculating means 12 for calculating wheel speeds Vw respectively from the outputs of the wheel speed sensors 1; estimated vehicle speed calculating means 13 for selecting the highest one out of the four wheel speeds Vw (select-high) and for obtaining an estimated vehicle speed Vv through a filter of acceleration and deceleration $\pm$1G; and threshold value calculating means 14 for calculating a threshold speed VT1 following the estimated vehicle speed Vv with a constant speed difference relative thereto. The control unit 2 further comprises acceleration and deceleration calculating means 15 for calculating the acceleration and deceleration dVs/dt of a system speed Vs; and reference speed calculating means 16 for calculating a reference speed Vr which, when the deceleration of the system speed Vs reaches a predetermined deceleration (for example, −1G), linearly decreases at a deceleration of −1G from a speed obtained by subtracting a predetermined value $\Delta$V from the system speed Vs. A control portion 17 is responsive to the outputs of the means 12 to 16 to control the ON and OFF of the hold valves 6 and the decay valves 7 so as to effect the increase, hold and decrease of the brake hydraulic pressure within each wheel cylinder 11.

One example of the anti-lock control method according to the present invention will now be described with reference to control time charts of FIGS. 2 and 3 and a control flow chart of FIG. 4.

Figure 2:
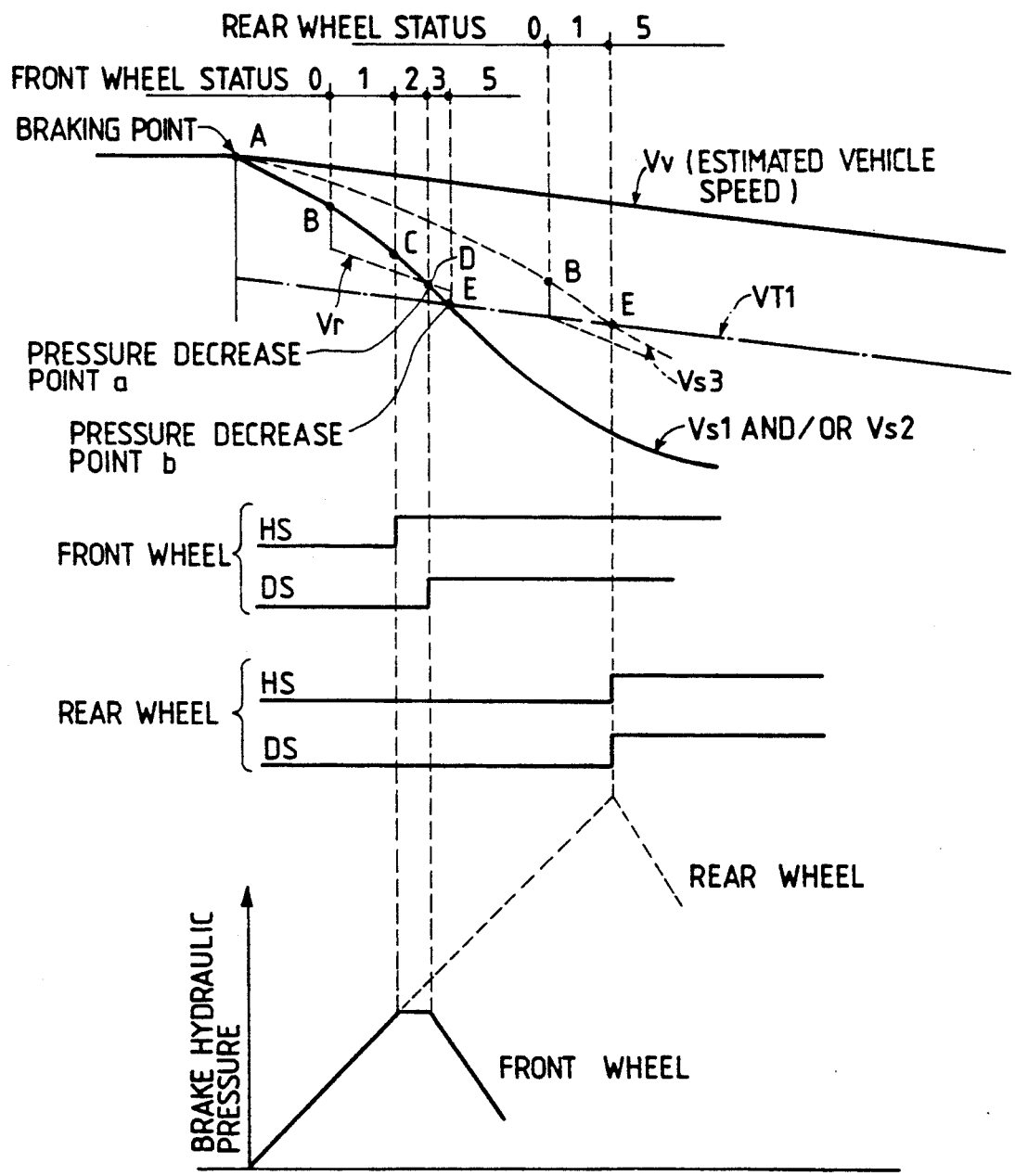
FIGS. 2 and 3 are timing charts of the anti-lock control.
Figure 3:
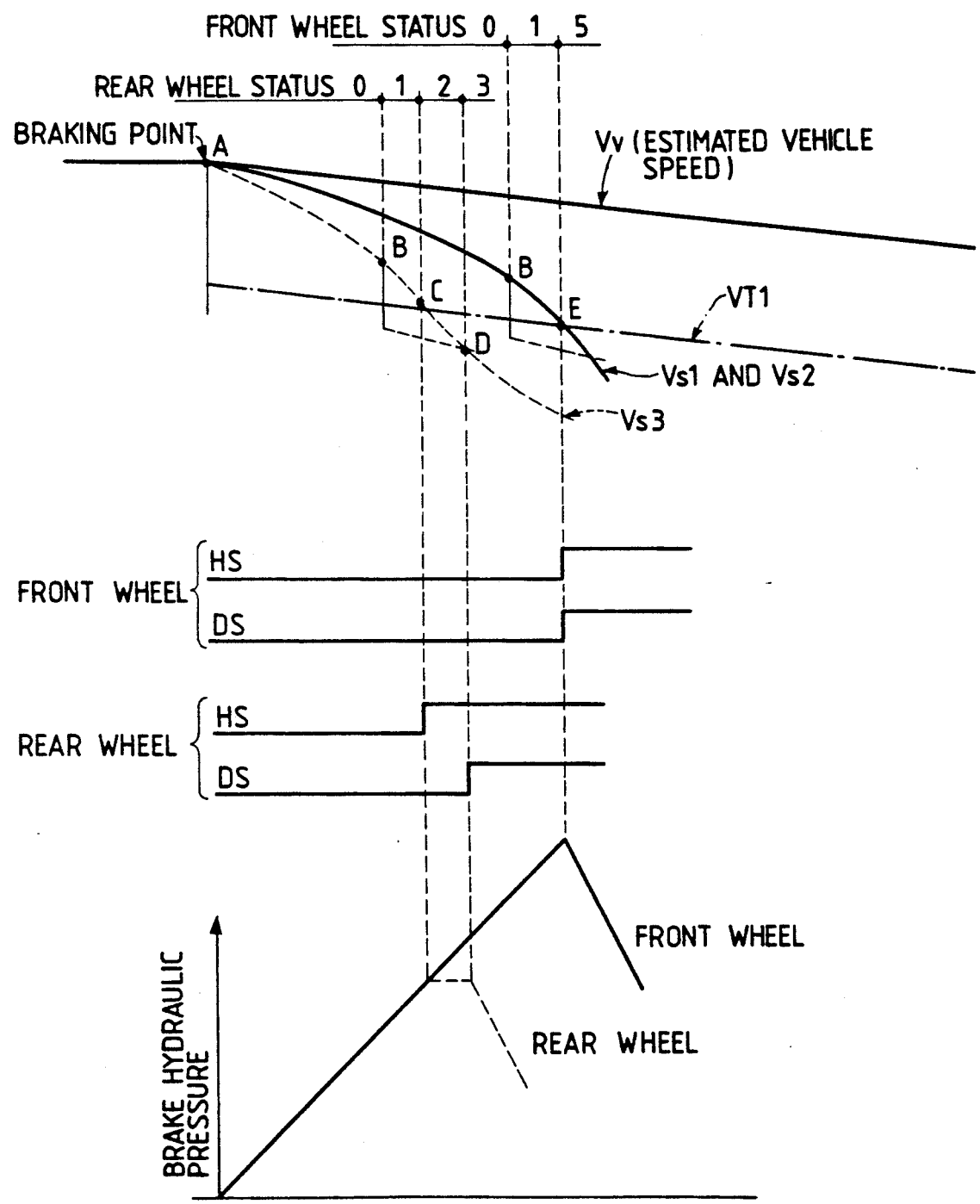
Figure 4:
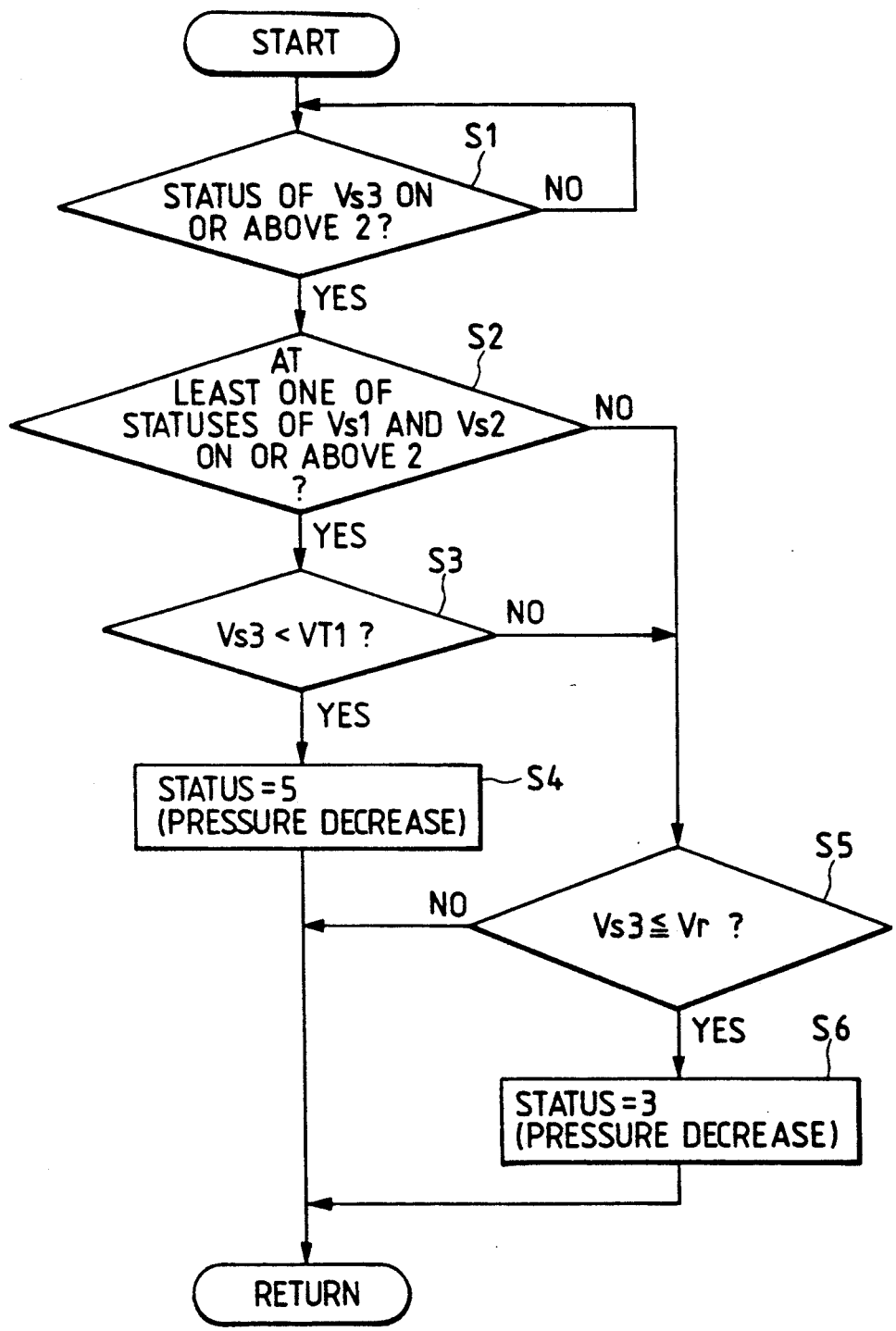
FIG. 4 is a flow chart of the anti-lock control.
Figure 5:
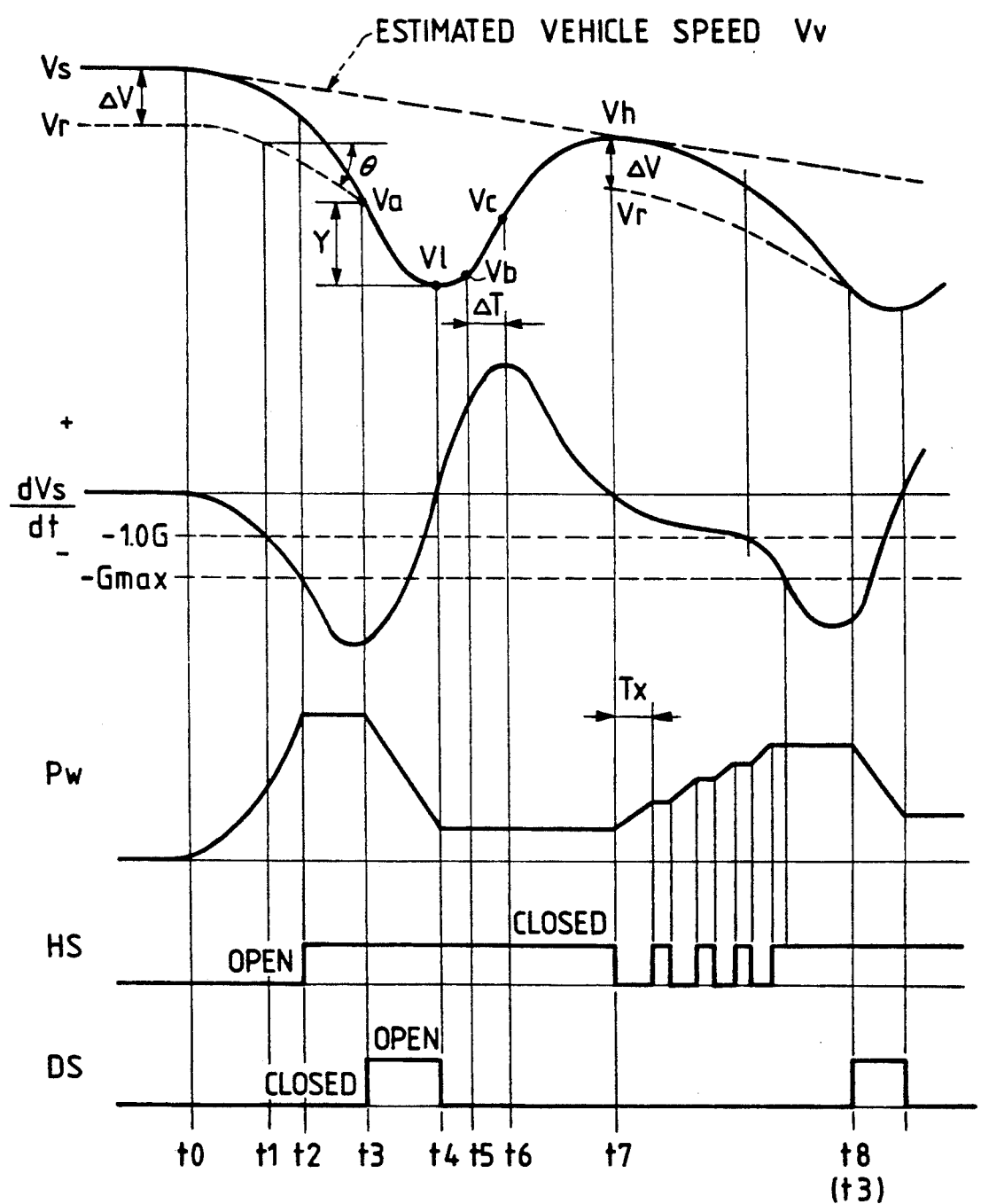
FIG. 5 is a timing chart of a conventional anti-lock control method.

First, reference is made to statuses shown in FIGS. 2 and 3.

Status 0

This status is provided from time A when the brake switch 4 is turned on upon pressing-down of the brake pedal to time B when the linearly-decreasing reference speed Vr occurs as a result of the deceleration dVs/dt of the system speed reaching the predetermined deceleration (for example, $-1G$). The hold valve 6 is in an open condition, and the decay valve 7 is in a closed condition. The brake hydraulic pressure within the wheel cylinder 11 is increased by the brake fluid fed from the master cylinder 3.

Status 1

This status is provided from time B of the occurrence of the reference speed Vr to time C when it is decided that the deceleration dVs/dt of the system speed Vs reaches a predetermined deceleration $-Gmax$. In this status, the hold valve 6 and the decay valve 7 are not activated, so that the hold valve 6 is in an open condition and the decay valve is in a closed condition.

Status 2 (hold)

This status is provided from time C of decision of $-Gmax$ to an earlier one out of the time (pressure decrease point a) when the system speed Vs becomes lower than the reference speed Vr ($Vs \leq Vr$) and the time (pressure decrease point b) when the system speed Vs becomes lower than the threshold speed VT1 ($Vs < VT1$). At time C, the hold valve 6 is closed, thereby holding the brake hydraulic pressure. In FIG. 2, the status 2 terminates at time D when the system speed Vs becomes lower than the reference speed Vr; however, if the system speed Vs becomes lower than the threshold speed VT1 prior to time D, the status 2 terminates at that time.

Status 3 (pressure decrease)

This status is provided from time D when the system speed Vs becomes lower than the reference speed Vr to time E when the system speed Vs becomes lower than the threshold speed VT1. The decay valve 7 is opened at time D, thereby starting the decrease of the brake hydraulic pressure.

Status 5 (pressure decrease)

This status is provided when the control cycle is the first cycle, or when deceleration VvG of the estimated vehicle speed Vv is greater than $-0.22G$. And, this status is provided from time E when the system speed Vs becomes lower than the threshold speed VT1 to the time when it is decided that the system speed Vs reaches its low peak. In this status 5, the hold and decay valves 6 and 7 are operated so that the hold valve 6 is in an closed condition and the decay valve 7 is in an open condition.

Next, the flow chart of FIG. 4 will now be described.

First, in Step S1, it is judged whether or not the system speed Vs3 of the third system to which the left and right rear wheels belong is on or above the status 2. Namely, it is judged whether or not the deceleration of the system speed Vs3 reaches the threshold value $-Gmax$ representing the predetermined maximum deceleration. If the judgment is "YES", the program proceeds to Step S2 in which it is judged whether or not either of the system speeds Vs1 and Vs2 of the left and right front wheels are on or above the status 2 (see FIG. 2). If the judgment is "YES", the program proceeds to Step S3 in which it is judged whether or not the third system speed Vs3 is lower than the above threshold value VT1. If $Vs3 < VT1$ is decided, the program proceeds to Step S4 in which the status 5 is set with respect to the rear wheel system, so that the decrease of the brake hydraulic pressure in the third system is started from time E (see FIG. 2). If the judgment in each of Step S2 and Step S3 is "NO", the program proceeds to Step 5 in which the third system speed Vs3 is compared with the above reference speed Vr. If $Vs3 \leq Vr$ is decided, the program proceeds to Step 6 in which the third system is subjected to the status 3, so that the pressure decrease is started from time D when the third system speed Vs3 becomes equal to or lower than the reference speed Vr (see FIG. 3).

As described above, in this embodiment, in the vehicle using the three-channel anti-lock control method based on the above front wheel independent-and-rear wheel select-low, only when the third system speed Vs3 to which the left and right rear wheels belong is subjected to the anti-lock control due to the abruptly decreasing of the third system speed before at least one of the left and right front wheel systems begin to be subjected to the anti-lock control, the decrease of the brake hydraulic pressure is not started even if the third system speed Vs3 becomes lower than the above threshold speed VT1 ($Vs3 < VT1$). In such case, Only when the third system speed Vs3 becomes equal to or lower than the reference speed Vr ($Vs3 \leq Vr$), the decrease of the hydraulic pressure is started. By doing so, an excessive decrease of the brake hydraulic pressure in the third system at the time of the braking during the turning of the vehicle is prevented.

As is clear from the foregoing description, in the present invention, there is set the reference speed Vr which, when the system speed decreased by increasing the brake hydraulic pressure reaches the predetermined deceleration, linearly decreases at the predetermined deceleration from the speed $(Vs - \Delta V)$ lower a predetermined value $\Delta V$ than the system speed Vs. Also, there is set the threshold speed VT1 which follows the estimated vehicle speed Vv with a constant speed difference relative thereto in such a manner that the relation of $Vv > VT1$ is kept. The decrease of the brake hydraulic pressure is started from an earlier one out of the time when the system speed Vs becomes lower than the reference speed Vr and the time when the system speed Vs becomes lower than the threshold speed VT1. With respect to the third system to which the left and right rear wheels belong, only when the anti-lock control of the third system is started prior to both of the anti-lock controls of the first and second systems to which the left and right front wheels belong, respectively, the decrease of the brake hydraulic pressure is started only if the third system speed Vs3 becomes equal to or lower than the reference speed Vr. Therefore, even at the time of the braking during the turning of the vehicle, an inadequate brake hydraulic pressure due to the speed difference between the inner and outer wheels is overcome, thereby preventing an increased braking distance.

What is claimed is:

1. In a vehicle anti-lock control method wherein speeds of left and right front wheels represent first and second system speeds, respectively; a lower one out of speeds of left and right rear wheels is used as a third system speed; and brake hydraulic pressure is controlled using said system speeds as wheels speeds to be controlled, thereby effecting a three-channel anti-lock control; the improved method comprising the steps of:

setting an estimated vehicle speed Vv based on the highest one out of the speeds of the four wheels at the time of the braking;

setting a threshold speed VT1 which follows said estimated vehicle speed Vv with a constant speed difference relative thereto in such a manner that the relation of Vv>VT1 is kept;

setting a difference speed Vr, when said system speeds decrease by increasing the brake hydraulic pressure until reaching a predetermined deceleration, which linearly decreases at said predetermined deceleration from a speed which is lower than said system speeds by a predetermined value $\Delta V$; and starting the decrease of the brake hydraulic pressure of an alpha system when a system speed of said alpha system becomes lower than said reference speed Vr and the decreasing of the brake hydraulic pressure of a beta system when said system speed of said beta system becomes lower than said threshold speed VT1;

wherein:

if said alpha system consists of said front wheels then said beta system consists of said rear wheels; and if said alpha system consists of said rear wheels then said beta system consists of said front wheels.

2. An anti-lock control system for controlling brake hydraulic pressure of four wheels of an automotive vehicle to be decreased, held and increased, said system comprising a control unit including:

wheel speed calculating means for calculating four wheel speeds;

system speed calculating means for calculating first and second system speeds Vs1 and Vs2 based on left and right front wheel speeds, respectively, and a third system speed Vs3 based on a lower one of left and right rear wheel speeds;

estimated vehicle speed calculating means for calculating an estimated vehicle speed Vv based on the highest one of said four wheel speeds;

threshold speed calculating means for calculating a threshold speed VT1 which follows said estimated vehicle speed Vv with a predetermined speed difference;

deceleration calculating means for calculating first, second and third deceleration dVs1/dt, dVs2/dt and dVs3/dt of said system speeds Vs1, Vs2 and Vs3, respectively;

reference speed calculating means for calculating reference speeds Vr1, Vr2 and Vr3 based on said system speeds Vs1, Vs2 and Vs3, respectively, each of said reference speeds being set at the time when respective one of said decelerations reaches a predetermined deceleration, and is linearly decreasing at said predetermined deceleration from a speed which is obtained by subtracting a predetermined value $\Delta V$ from said system speeds, respectively; and means for comparing each of said first, second and third decelerations dVs1/dt, dVs2/dt and dVs3/dt with a predetermined maximum deceleration $-Gmax$;

wherein:

if said first deceleration dVs1/dt and said second deceleration dVs2/dt satisfies one of the conditions dVs1/dt$\leq -Gmax$ and dVs2/dt$\leq -Gmax$ when said third deceleration dVs3/dt satisfies a condition dVs3/dt$\leq -Gmax$, then the brake hydraulic pressures of left and right rear wheels are decreased when said third system speed Vs3 satisfies one of the conditions Vs3$\leq$Vr3 and Vs3<VT1;

if both said first deceleration dVs1/dt and said second deceleration dVs2/dt satisfy conditions dVs1/dt>$-Gmax$ and dVs2/dt>$-Gmax$, respectively, when said third deceleration dVs3/dt satisfies a condition dVs3/dt$\leq -Gmax$, then the brake hydraulic pressures of left and right rear wheels are decreased when said third system speed Vs3 satisfies a condition Vs3$\leq$Vr3.

* * * * *